(12) United States Patent
Kroisandt

(10) Patent No.: US 6,505,533 B2
(45) Date of Patent: Jan. 14, 2003

(54) LATHE STEADY REST

(75) Inventor: Kurt Kroisandt, Sontheim/Brenz (DE)

(73) Assignee: Rohm GmbH, Sontheim (DE)

( * ) Notice: Subject to any disclaimer, the term of this patent is extended or adjusted under 35 U.S.C. 154(b) by 0 days.

(21) Appl. No.: 09/910,468

(22) Filed: Jul. 20, 2001

(65) Prior Publication Data

US 2002/0029668 A1 Mar. 14, 2002

(30) Foreign Application Priority Data

Jul. 22, 2000 (DE) .......................................... 200 12 710

(51) Int. Cl.⁷ .......................... B23B 29/00; B23B 27/10
(52) U.S. Cl. ............................................. 82/53; 82/157
(58) Field of Search .............................. 83/53, 50, 157; 407/15, 11; 82/56, 61, 70.2, 113; 408/56–58, 59

(56) References Cited

U.S. PATENT DOCUMENTS

| | | | | |
|---|---|---|---|---|
| 3,889,520 A | * | 6/1975 | Stoferle et al. .............. | 73/37.5 |
| 4,598,617 A | * | 7/1986 | Kubo et al. ................ | 82/36 R |
| 4,631,995 A | * | 12/1986 | Vroenen ....................... | 82/39 |
| 4,650,237 A | * | 3/1987 | Lessway .................. | 294/119.1 |
| 4,754,673 A | * | 7/1988 | Hiestand ....................... | 82/39 |
| 5,285,599 A | * | 2/1994 | Lessway ..................... | 51/289 |
| 5,402,696 A | * | 4/1995 | Hecht et al. .................. | 82/158 |
| 5,540,526 A | * | 7/1996 | Hyatt et al. ................ | 408/1 R |
| 6,270,295 B1 | * | 8/2001 | Hyatt et al. ................ | 408/1 R |

* cited by examiner

*Primary Examiner*—Derris H. Banks
*Assistant Examiner*—Jamila Williams
(74) *Attorney, Agent, or Firm*—Herbert Dubno; Andrew Wilford

(57) ABSTRACT

A lathe steady rest has a frame adjacent an axis about which a lathe rotates a workpiece, a pair of arms pivotal on the frame about arm axes parallel to the workpiece axis and having outer ends radially displaceable relative to the workpiece axis, and a slide displaceable radially of the workpiece axis on the frame and having an outer end turned toward the workpiece. The outer ends are angularly spaced about the axis. Respective rollers rotatable on the outer ends about roller axes parallel to the workpiece axis radially engage the workpiece. Respective caps mounted on the arm outer ends over the respective rollers have passages with outer ends directed radially inward against the workpiece adjacent the respective rollers. A fluid is supplied under pressure to the passages to flush particles from the workpiece. The chamber allows the respective cap to change position without losing pressure in its passages.

6 Claims, 4 Drawing Sheets

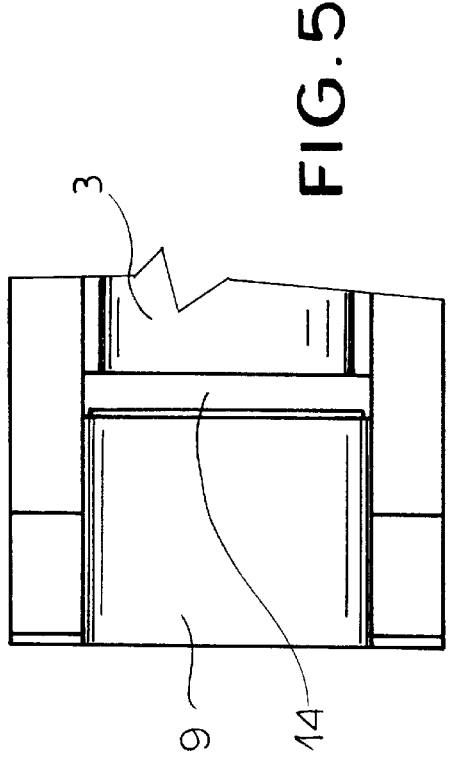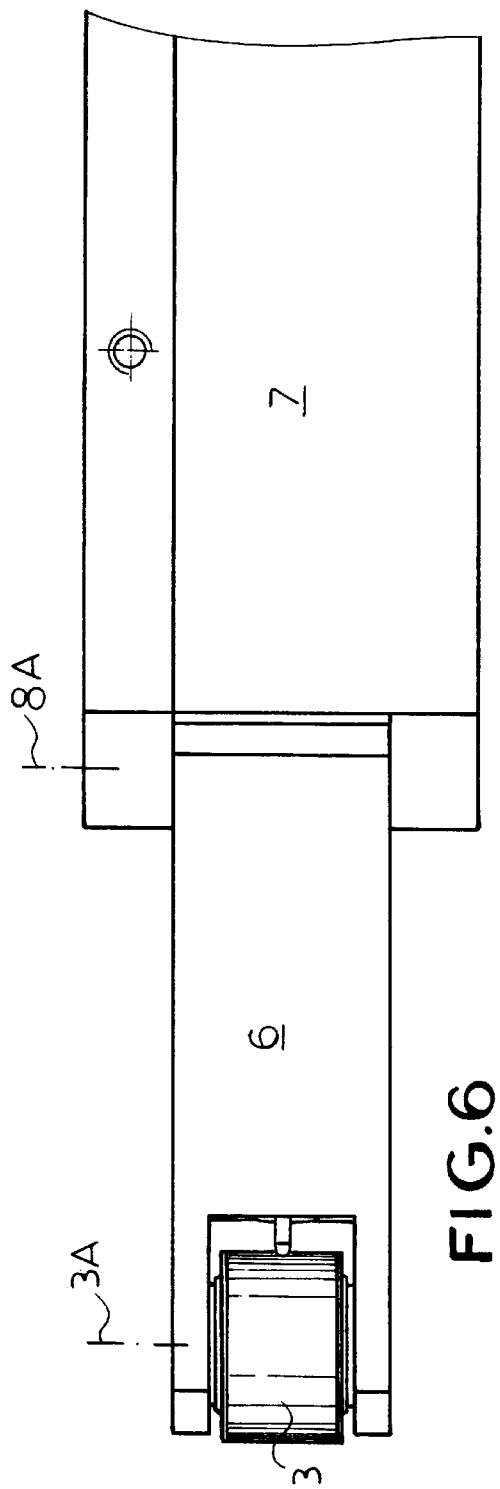
FIG. 5
FIG. 6

LATHE STEADY REST

FIELD OF THE INVENTION

The present invention relates to a lathe steady rest. More particularly this invention concerns such a rest used to radially support a workpiece rotating about a center in a lathe and subject to chip-removing machining at a location between the steady rest and the lathe headstock or tailstock.

BACKGROUND OF THE INVENTION

A standard steady rest for a lathe has a frame adjacent the axis about which a lathe rotates a workpiece, a pair of arms pivotal on the frame about arm axes parallel to the workpiece axis and having outer ends radially displaceable relative to the workpiece axis, and a slide displaceable radially of the workpiece axis on the frame and having an outer end turned toward the workpiece. These outer ends are angularly spaced about the axis. Respective rollers are rotatable on the outer ends about roller axes parallel to the workpiece axis and can radially engage the workpiece. Respective caps mounted on the arm outer ends over the respective rollers have scraper blades and serve to prevent particles, such as grit or turnings produced by the adjacent machining operation, from getting between the rollers and the workpiece. The machining operation normally generates considerable such particles and, if they get into the steady, they can move the workpiece off center.

With time some of the smaller particles get under the roller covers and between the rollers and the workpiece. They become flattened there, either on the roller or on the workpiece, and create an out-of-round condition. The steady rest must therefore be meticulously cleaned between machining cycles and, sometimes, the machining operation must be halted so it can be cleaned.

OBJECTS OF THE INVENTION

It is therefore an object of the present invention to provide an improved lathe steady rest.

Another object is the provision of such an improved lathe steady rest which overcomes the above-given disadvantages, that is which effectively prevents particles from becoming lodged between the rest and the workpiece.

SUMMARY OF THE INVENTION

A lathe steady rest has according to the invention a frame adjacent an axis about which a lathe rotates a workpiece, a pair of arms pivotal on the frame about arm axes parallel to the workpiece axis and having outer ends radially displaceable relative to the workpiece axis, and a slide displaceable radially of the workpiece axis on the frame and having an outer end turned toward the workpiece. The outer ends are angularly spaced about the axis. Respective rollers rotatable on the outer ends about roller axes parallel to the workpiece axis radially engage the workpiece. Respective caps mounted on the arm outer ends over the respective rollers have passages with outer ends directed radially inward against the workpiece adjacent the respective rollers. A fluid is supplied under pressure to the passages to flush particles from the workpiece. The chamber allows the respective cap to change position without losing pressure in its passages.

Thus the fluid, which can be compressed air that also acts as a coolant, effectively cleans from the workpiece any particles that might be able to get under the roller cover. Since this flushing operation takes place under the roller cover, a separate shield for catching the particles is not needed.

The caps according to the invention are pivotal on the respective outer arm ends generally about the respective roller axes. The frame is formed with passages connected to the fluid supply and the arms are formed with chambers connected to the passages of the arms and of the frame. Thus this system can be used on workpieces of different diameter. Each cover has a respective scraper blade engageable with the workpiece and each arm is provided with a spring urging the respective scraper blade into radial engagement with the workpiece.

The passage outer ends are directed tangentially upstream from the respective rollers. This ensures the best flushing effect.

The frame is formed adjacent the slide with a pocket having a cover forming an outlet opening. The fluid-supply means are connected to the pocket for projecting the fluid from the opening. Since the axis of movement of the slide normally forms a small angle with the horizontal, two of the pockets having covers and openings angularly flank the slide. In use a plug blocks one of the openings of the pockets, typically the opening downstream of the roller. Thus only the upstream side likely to foul is cleared; the other downstream side is closed to save pressure.

BRIEF DESCRIPTION OF THE DRAWING

The above and other objects, features, and advantages will become more readily apparent from the following description, reference being made to the accompanying drawing in which:

FIGS. 5 and 6 are views taken in the direction of respective arrows V and VI of FIG. 1.

SPECIFIC DESCRIPTION

Figure 1:
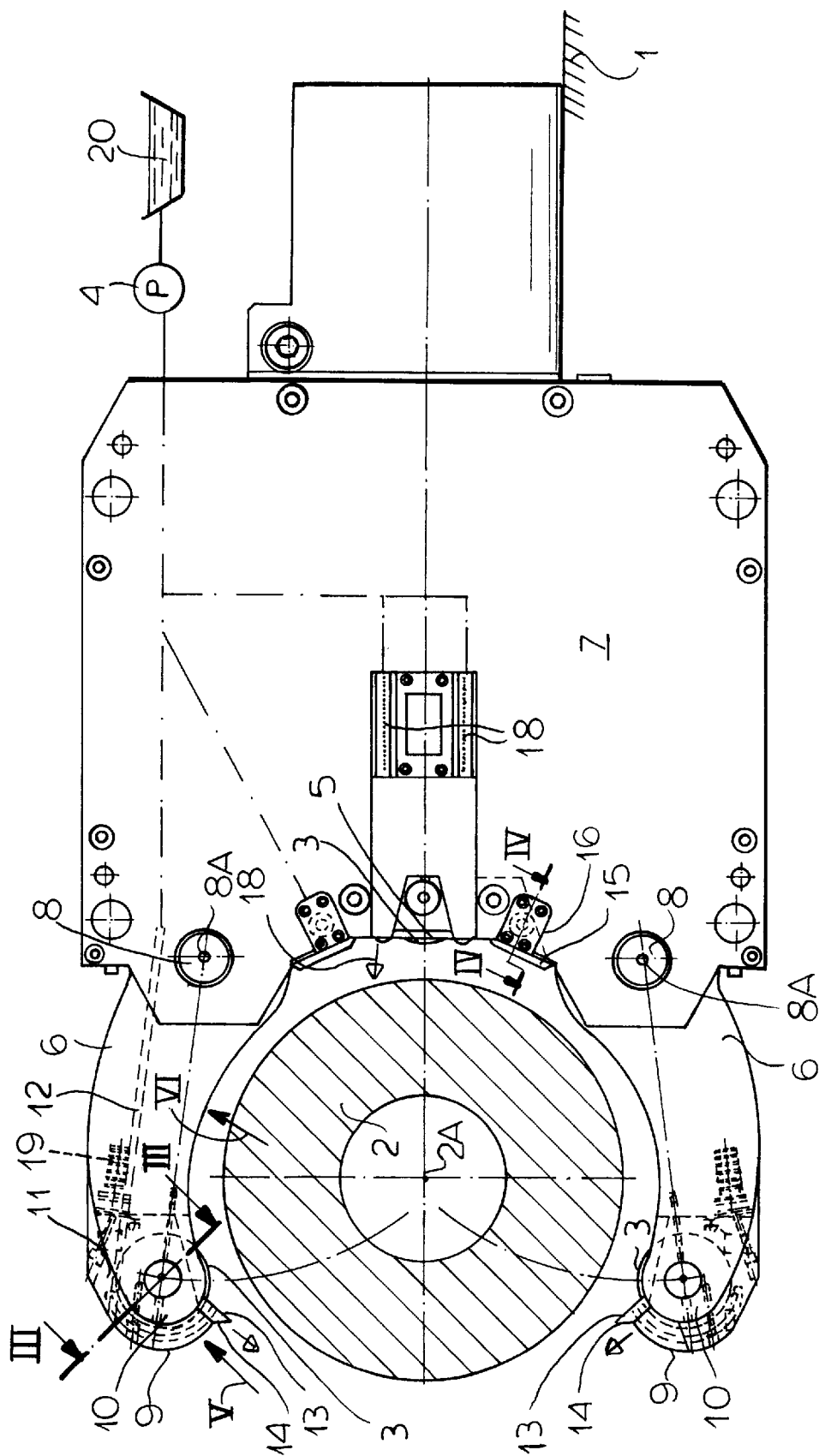
FIG. 1 is an axial end view of the steady rest according to the invention with the rollers out of contact with the workpiece.
Figure 2:
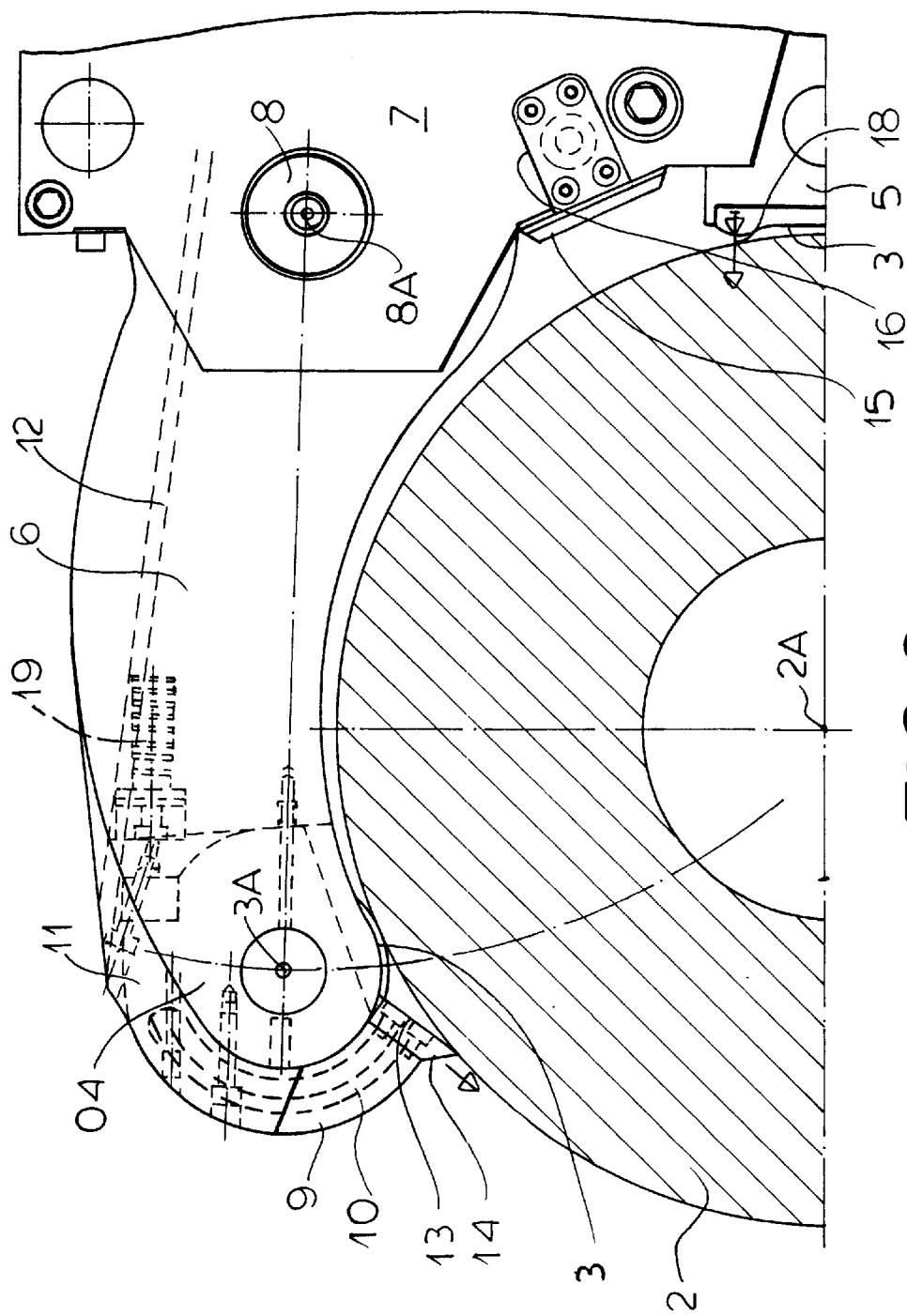
FIG. 2 is a large-scale view of the upper portion of the structure shown in FIG. 1 but with the illustrated roller contacting the workpiece.

As seen in FIGS. 1 and 2 a steady rest has a housing 7 mounted on a lathe shown schematically at 1 and having an unillustrated headstock and tailstock between which an elongated cylindrical workpiece 2 is spanned for rotation about a normally horizontal center axis 2A. The housing 5 has a pair of arms 6 and a slide 5 carrying rollers 3 rotatable about roller axes 3A parallel to and angularly equispaced about the axis 2A on outer ends of the slide 5 and arms 6. The arms 6 have inner ends mounted on pivots 8 for pivoting about axes 8A parallel to the axis 2A so that the respective rollers 3 can move generally radially of the axis 2A, unillustrated biasing means being provided to urge the arm outer ends carrying the rollers 3 radially inward. Similarly the slide 5 is biased radially inward of the axis 2A to press the center roller 3 against an outer surface of the workpiece 2. The rollers 3 are angularly equi-spaced about the axis 2A and all lie in a common plane perpendicular to this axis 2A.

The outer ends of the arms 6 are provided with caps or hoods 9 pivotal about the respective axes 3A by respective springs 19 to urge respective scraper blades 14 against the workpiece 2. One of the scraper blades 14 is directed angularly in one direction relative to the axis 2A and the other in the opposite direction. These hoods 9 are formed with passages 10 having outer ends 13 that are directed radially inward against the workpiece 2 and inner ends opening into respective chambers 11 pressurized via further passages 12 in the respective arms 6 and housing 7 to a pump 4 connected to a fluid supply 20. As clear from FIG. 2 the ends 13 are directed upstream and open tangentially to the surface as indicated by the small arrows so as to have an excellent flushing effect and to clear the workpiece surface upstream of the roller 3.

The pump 4 can therefore direct jets of a flushing fluid against the workpiece to free from it small particles that can slip under the scraper lip 14. Thus there will be no buildup of these particles on the workpiece 2 and/or rollers 3.

Figure 4:
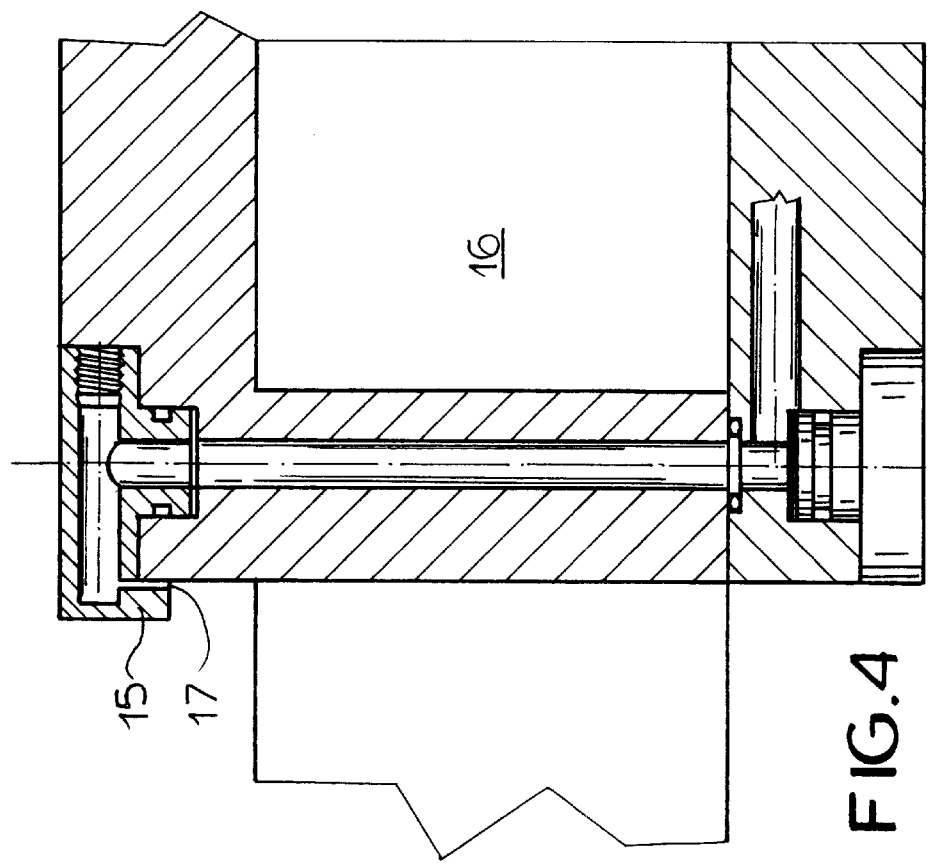
FIGS. 3 and 4 are sections taken along respective lines III—III and IV—IV of FIG. 1.
Figure 3:
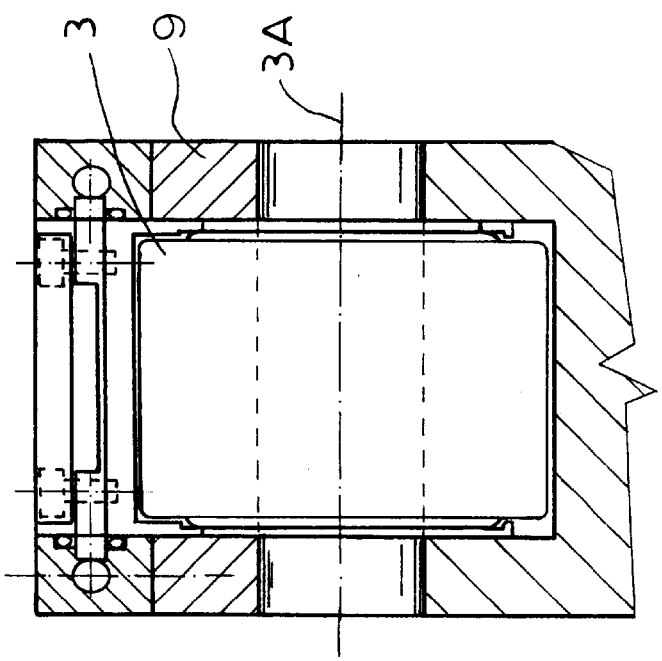

Angularly to each side of the slide 5 the housing 7 is formed with pockets 16 having covers 15 (FIG. 4) forming outlets 17 directed at the slide 5. In addition the slide 5 is formed on each side of the respective roller 3 with a passage 18 whose outer end is directed toward the workpiece 2. In this manner the area adjacent and to each side of the center roller 3 of the slide 5 can also be kept clean. Depending on rotation direction, one of the pockets 16 can be closed by a plug either blocking the opening 17 or filling the pocket 16.

The fluid can be a coolant/lubricant liquid such as a thin oil, or can even be compressed air.

I claim:

1. In combination with a lathe rotating an elongated workpiece about a workpiece axis, a steady rest comprising:
   a frame adjacent the workpiece axis;
   a pair of arms pivotal on the frame about arm axes parallel to the workpiece axis and having outer ends radially displaceable relative to the workpiece axis;
   a slide displaceable radially of the workpiece axis on the frame and having an outer end turned toward the workpiece, the outer ends being angularly spaced about the axis;
   respective rollers rotatable on the outer ends about roller axes parallel to the workpiece axis and radially engageable with the workpiece;
   respective caps mounted on the arm outer ends over the respective rollers and having passages with outer ends directed radially inward against the workpiece adjacent the respective rollers; and
   means for supplying a fluid to the passages and thereby flushing particles from the workpiece.

2. The lathe steady rest defined in claim 1 wherein the caps are pivotal on the respective outer arm ends generally about the respective roller axes, the frame being formed with passages connected to the fluid-supply means and the arms with chambers connected to the passages of the arms and of the frame.

3. The lathe steady rest defined in claim 2 wherein each cover has a respective scraper blade engageable with the workpiece and each arm is provided with spring means urging the respective scraper blade into radial engagement with the workpiece.

4. The lathe steady rest defined in claim 1 wherein the passage outer ends are directed tangentially of a workpiece surface.

5. The lathe steady rest defined in claim 1 wherein the frame is formed adjacent the slide with a pocket having a cover forming an outlet opening, the fluid-supply means being connected to the pocket for projecting the fluid from the opening.

6. The lathe steady rest defined in claim 5 wherein two of the pockets have covers and openings angularly flank the slide.

* * * * *